United States Patent
Xu et al.

(10) Patent No.: US 8,270,691 B2
(45) Date of Patent: Sep. 18, 2012

(54) METHOD FOR FUSING IMAGES ACQUIRED FROM A PLURALITY OF DIFFERENT IMAGE ACQUIRING MODALITIES

(75) Inventors: Chenyang Xu, Allentown, NJ (US); Daniel J. Paulish, Yardley, PA (US); Ramesh Viswanathan, Princeton, NJ (US)

(73) Assignee: Siemens Aktiengesellschaft, München (DE)

( * ) Notice: Subject to any disclaimer, the term of this patent is extended or adjusted under 35 U.S.C. 154(b) by 668 days.

(21) Appl. No.: 12/212,921

(22) Filed: Sep. 18, 2008

(65) Prior Publication Data

US 2009/0092298 A1    Apr. 9, 2009

Related U.S. Application Data

(60) Provisional application No. 60/978,528, filed on Oct. 9, 2007.

(51) Int. Cl.
*G06K 9/00* (2006.01)
*A61B 8/00* (2006.01)
(52) U.S. Cl. ........................ 382/128; 600/147
(58) Field of Classification Search .................. None
See application file for complete search history.

(56) References Cited

U.S. PATENT DOCUMENTS

| | | | | |
|---|---|---|---|---|
| 5,325,449 | A * | 6/1994 | Burt et al. | 382/240 |
| 5,488,674 | A * | 1/1996 | Burt et al. | 382/284 |
| 7,813,535 | B2 * | 10/2010 | Florin et al. | 382/128 |
| 7,822,241 | B2 * | 10/2010 | Eck et al. | 382/128 |
| 8,144,951 | B2 * | 3/2012 | Martin et al. | 382/128 |
| 2004/0236206 | A1 * | 11/2004 | Sakas et al. | 600/407 |
| 2005/0203420 | A1 * | 9/2005 | Kleen et al. | 600/476 |
| 2006/0262966 | A1 * | 11/2006 | Eck et al. | 382/128 |
| 2008/0002880 | A1 * | 1/2008 | Coleby et al. | 382/154 |
| 2008/0137924 | A1 * | 6/2008 | Boese et al. | 382/128 |
| 2008/0147086 | A1 * | 6/2008 | Pfister et al. | 606/130 |
| 2008/0298664 | A1 * | 12/2008 | Martin et al. | 382/131 |
| 2010/0067768 | A1 * | 3/2010 | Ionasec et al. | 382/131 |
| 2010/0103194 | A1 * | 4/2010 | Chen et al. | 382/168 |

FOREIGN PATENT DOCUMENTS

JP    2006297105 A  * 11/2006

* cited by examiner

*Primary Examiner* — Jermele M Hollington
(74) *Attorney, Agent, or Firm* — Donald B. Paschburg

(57) ABSTRACT

A method for fusing a plurality of images. The method includes: acquiring the plurality of images from a plurality of different modalities, each one of the images having a different reference space; and fusing the plurality of images into a common reference space, such common reference space being different from the reference space of each one of the plurality of acquired images. Thus, with such method, a unified process is provided for handling fusion across multiple clinical interventional and/or surgery (i.e., intra-operative) procedures.

10 Claims, 5 Drawing Sheets

METHOD FOR FUSING IMAGES ACQUIRED FROM A PLURALITY OF DIFFERENT IMAGE ACQUIRING MODALITIES

CROSS-REFERENCE TO RELATED APPLICATIONS

This application claims priority from U.S. Provisional application No. 60/978,528 filed Oct. 9, 2007, the entire subject matter thereof being incorporated herein by reference.

TECHNICAL FIELD

This invention relates generally to image fusion and more particularly to image fusion of images acquired from a plurality of different modalities and for fusing such plurality of images into a common reference space.

BACKGROUND

As is known in the art, with the advancement of both structural and functional imaging technologies (i.e., modalities) such as computed tomography (CT), magnetic resonance (MR), fluoro, ultrasound, positron emission tomography (PET), singleton photon emission computed tomography, there have been a significant increase in the use of image fusion technologies, dealing with aligning images into a common reference space and visualizing the fused results, in a variety of medical clinical applications ranging from screening, diagnosis, intervention & surgery, to follow-up.

In intervention and surgery applications, image fusion has become a pivotal technology to bring relevant image information obtained from different imaging modality either pre-operative (pre-op) or intra-operative (intra-op) (i.e., occurring, carried out, or occurring during surgery or intervention) into the intervention and surgical workspace to improve the accuracy, efficiency, and safety of the navigation of the treatment device navigation and the delivery of treatment. Images for intervention and surgical applications come in more diverse forms than other type of clinical applications. Often high quality multimodal pre-op three-dimensional (3D) or 3D+t (where t is time) images are registered (i.e., fused or merged) with low quality but real-time 2D or 2D+t images, which pose a great amount of challenges to fusion algorithms. As a result, often special fusion algorithms are developed for each special interventional and surgery application as illustrated in FIG. 1. This dominant R&D paradigm in image fusion has been the main driving force for its success in interventional and surgical labs. However, as the number of interventional and surgical applications require image fusion further increase rapidly, the current practice become more a hindrance as often for each new image source to be fused, a specialized fusion algorithm has to be developed and validated, whereas similar problems could have been solved in another application context with slightly different ways of handling the data and registration.

Thus, while images acquired using different modalities are frequently registered and displayed as fused images, one-to-one and special registrations are done for specific procedures. That is, if a CT image had been obtained and then an ultrasound image was requested, the image space of the ultrasound image was fused into the image space of the previous CT. If then a PET image was required, the PET image space was fused into the CT image space, and so one in a one-to-one manner.

SUMMARY

In accordance with the present invention, a method is provided for fusing a plurality of images. The method includes: acquiring the plurality of images from a plurality of different modalities, each one of the images having a different reference space; and fusing the plurality of images into a common reference space, such common reference space being different from the reference space of each one of the plurality of acquired images. Thus, with such method, a unified process is provided for handling fusion across multiple clinical interventional or surgery procedures.

In one embodiment, each image is registered within a 3-dimensional patient space and then rendered as a combined image within a specified timeframe.

In one embodiment, registration is performed using a combination of physical body markers and raw intensity images.

In one embodiment, the physical body include locations of various organs or joints, artificial markers defined by the procedure being performed, computer-automatically extracted features or markers.

In one embodiment, the raw intensity images are based on their availability for the intended clinical procedure.

In one embodiment, the raw intensity images are based on their availability for the intended clinical procedure.

In one embodiment, the common reference space is adapted to the patient space for surgical device navigation and treatment during the interventional and surgery procedure.

With such method:
i) a common fusion space to which each image is registered is defined
ii) a unified method is provided for fusing multiple images and rendering the images as a 3-D image map showing image overlaps and different resolutions
iii) a processing platform (Multi Modality Image Fusion (MMIF) platform to be described) is provided that can update the image map rendering fast enough to allow real-time application for interventional procedures.
iv) a standard processing platform that can be easily customized towards different kinds of interventional applications As noted above, the invention includes a Multi Modality Image Fusion (MMIF) platform such that multiple images from multiple modalities can be combined and displayed across multiple intervention and surgery applications in a standard and unified manner. The platform provides sufficient processing power such that the fusion of images can be obtained and displayed in real-time. In MMIF, standard protocols and interfaces are defined to support new use cases of different imaging modalities and their image fusions. The MMIF platform provide a flexible framework that allows both sharing and reusing of common fusion algorithms in different contexts and customization of the algorithms to accommodate the differences among various applications Thus, while images acquired using different modalities are frequently registered and displayed as fused images, one-to-one and special registrations are done for specific procedures according to the prior art where there is no general framework and platform that enables synergies of registration methods across procedures and its reuse for new procedures, which have grown significantly in the recent years, the MMIF platform registers newly acquired images and display them in the patient space in real-time. Thus, such fused images can be displayed in real-time and used as visual or automated aids for specific interventional surgical procedures. The MMIF is a general and unified registration approach that can be used for multiple images from different modalities and allows faster integration for new applications.

The MMIF introduces a Common Fusion Space (CFS) (i.e., the above-described common reference space), provides a common coordinate space that any fused images are transformed into. Each image is registered within the 3-dimensional patient space and then rendered as a combined image within a specified timeframe. The registration is done by using a combination of physical body markers such as the locations of various organs or joints, artificial markers that are defined by the procedure being performed, computer automatically extracted features or markers, and raw intensity images based on their availability for the intended clinical procedure. During the interventional and surgery procedure, CFS) (i.e., the above-described common reference space) is adapted to the patient space for surgical device navigation and treatment, to avoid costly repeated computation of each individual transformation from the image space to patient space. A variety of fused visualization techniques are available to be used for visualizing the fused images within the patient space or the CFS for the interventional and surgical procedure planning, guidance, and assessment. MMIF provides a unified approach to address both the common and special image fusion needs among a diverse range of interventional and surgical applications. Compared to the existing practice. MMIF avoids the costly reimplementation of registration algorithms each time a new imaging modality is introduced into the application and results in shorter research and development time.

More particularly, the Multi-Modality Image Fusion (MMIF) Platform is responsible for registering images from multiple modality sources and displaying them within a "common fused space". As images are collected during real-time interventional medical procedures, they are registered into the targeted patient space. The user of MMIF will primarily be an interventional radiologist or surgeon. The user will work at an MMIF workstation, and be responsible for acquiring, registering, and displaying multi-modality images that will be useful to the operating physician during interventional medical procedures. The interventional medical procedure will be performed on a patient.

The ability to render fused images from multiple modalities is implemented on a personal computer workstation that will implement the MMIF functionality. The fusion is achieved by a translation process that translates a Digital Imaging and Communications in Medicine (DICOM) image data stream into a standard intermediate format, called the "Common Fusion Space" (CFS), i.e., the above-described common reference space. The translated images are registered and rendered on the workstation. The real-time performance of the workstation will depend mainly on the data speeds of the images that are transmitted to the workstation and the processing power of the workstation's CPU. The data streams are translated to the patient space using pluggable adaptors (e.g., southbound gateways) within an adapter framework.

DICOM images originating from multiple modalities are received or stored by the fusion platform workstation and registered on-the-fly or offline into an intermediate patient space format, which is rendered to the workstation's display either real-time as the images are received, or offline for stored images. The adaptors (one for each modality source image) translate the DICOM image data stream into the intermediate format, for images that have been previously acquired and stored.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 3:
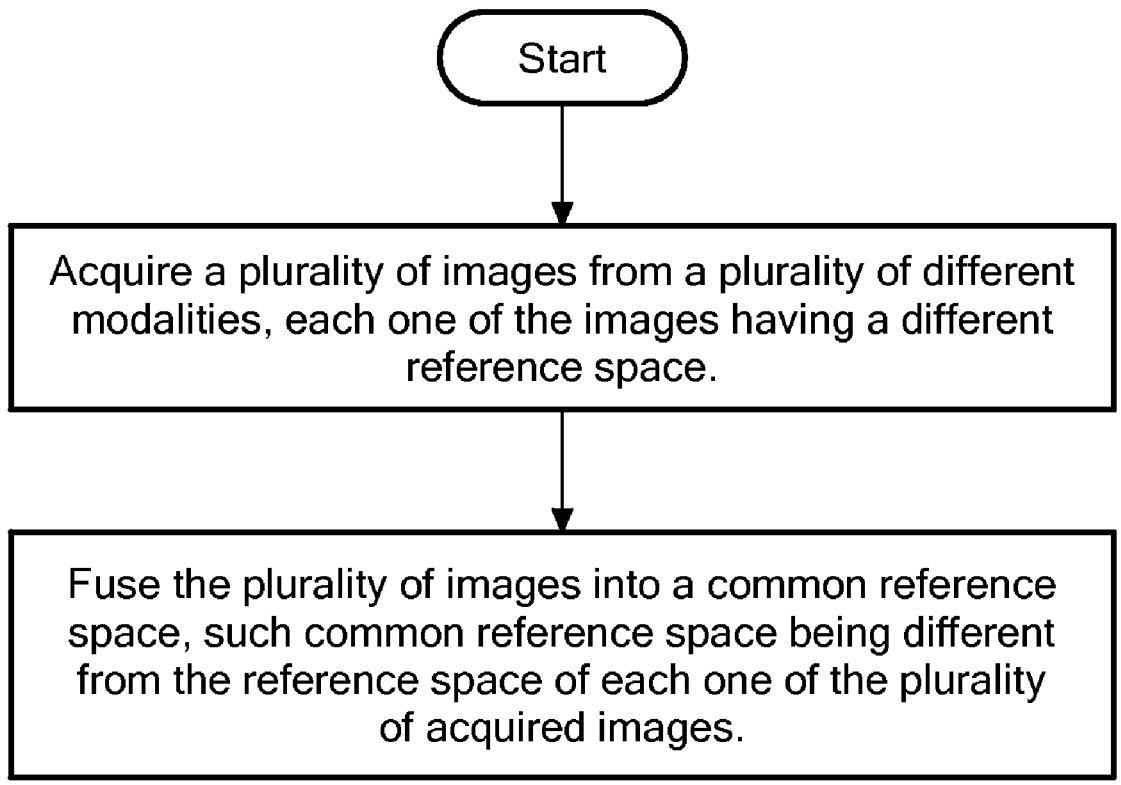
FIG. 3 is a flowchart of the process used to fuse images taken from a plurality of different modalities according to the invention.

Referring now to FIG. 3, a flowchart of a method for fusing a plurality of images is shown. The method includes acquiring the plurality of images from a plurality of different modalities, each one of the images having a different reference space; and fusing the plurality of images into a common reference space, such common reference space being different from the reference space of each one of the plurality of acquired images. The modalities may include, for example, computed tomography (CT), magnetic resonance (MR), fluoro, ultrasound, positron emission tomography (PET), singleton photon emission computed tomography, etc.

Each one of the images is registered within a 3-dimensional patient space and then rendered as a combined image within a specified timeframe. In one embodiment, registration is performed using a combination of physical body markers and raw intensity images. In one embodiment, the physical body include locations of various organs or joints, artificial markers defined by the procedure being performed, computer-automatically extracted features or markers. In one embodiment, the raw intensity images are based on their availability for the intended clinical procedure. In one embodiment, the raw intensity images are based on their availability for the intended clinical procedure. In one embodiment, the common reference space is adapted to the patient space for surgical device navigation and treatment during the interventional and surgery procedure. The images referenced to the common space reference is stored in a memory (i.e., database) of a Multi-modality Image Fusion Platform (MMIF) shown in FIG. 2 to streamline the utility of image fusion technology in different special clinical applications to avoid costly redundant R&D and validation.

Figure 1:
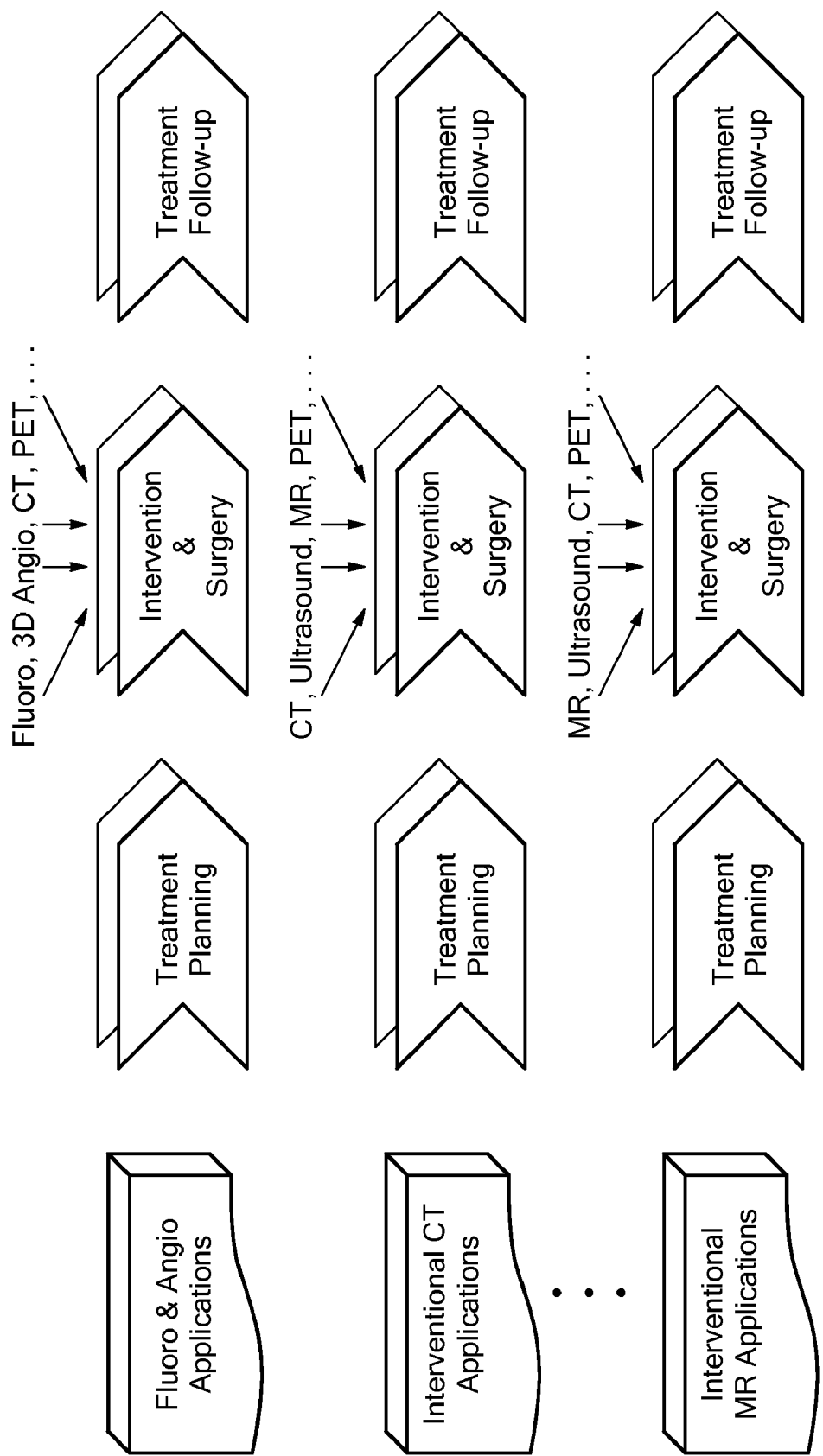
FIG. 1 is a diagram of a method used to fuse images taken from a plurality of different modalities according to the PRIOR ART.
Figure 2:
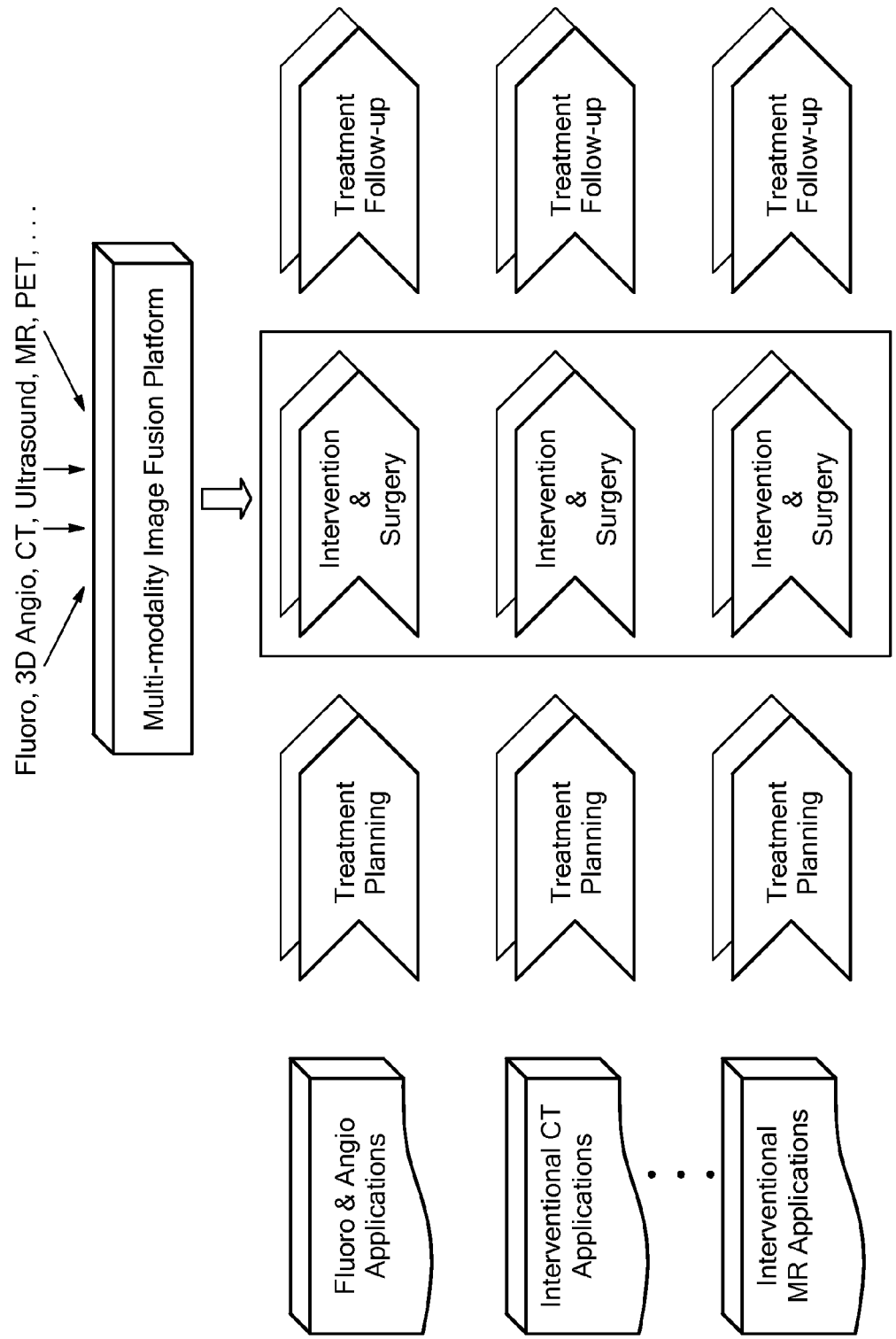
FIG. 2 is a diagram of a method used to fuse images taken from a plurality of different modalities according to the invention.

The Multi Modality Image Fusion (MMIF) platform is such that multiple images from multiple modalities can be combined and displayed across multiple intervention and surgery applications. The platform provides sufficient processing power such that the fusion of images can be obtained and displayed in real-time. In MMIF, standard protocols and interfaces are defined to support new use cases of different imaging modalities and their image fusions. The MMIF platform provides a novel and flexible framework that allows both sharing and reusing of common fusion algorithms in different contexts and customization of the algorithms to accommodate the differences among various applications. The MMIF platform is shown in FIG. 2.

The Multi-Modality Image Fusion (MMIF) Platform is responsible for registering images from multiple modality sources and displaying them within a fused "patient space". As images are collected during real-time interventional medical procedures, they are registered into the patient space. The user of MMIF will primarily be an interventional radiologist. The user will work at an MMIF workstation, and be responsible for acquiring, registering, and displaying multi-modality images that will be useful to the operating physician during interventional medical procedures. The interventional medical procedure will be performed on a patient.

Thus, the MMIF is a workstation platform by which multi modality images can be quickly registered to a patient space through the use of CFS for interventional and surgical procedures. The workstation can register previously acquired and stored images into the patient space. It can also register images acquired real-time such that they can be used for guidance during an interventional medical procedure. The Multi-Modality Image Fusion (MMIF) Platform is responsible for registering images from multiple modality sources and displaying them within a "common fused space". As images are collected during real-time interventional medical procedures, they will also be registered into the targeted patient space. The user of MMIF will primarily be an interventional radiologist or surgeon. The user will work at an MMIF workstation, and be responsible for acquiring, registering, and displaying multi-modality images that will be useful to the operating physician during interventional medical procedures. The interventional medical procedure will be performed on a patient.

The ability to render fused images from multiple modalities is implemented on a personal computer workstation that will implement the MMIF functionality. The fusion will be achieved by a translation process that will translate a DICOM image data stream into a standard intermediate format, called the "Common Fusion Space" (CFS). The translated images will be registered and rendered on the workstation. The real-time performance of the workstation will depend mainly on the data speeds of the images that are transmitted to the workstation and the processing power of the workstation's CPU. The data streams will be translated to the patient space using pluggable adaptors (e.g., southbound gateways) within an adapter framework.

DICOM images originating from multiple modalities are received or stored by the fusion platform workstation and registered on-the-fly or offline into an intermediate patient space format, which is rendered to the workstation's display either real-time as the images are received, or offline for stored images. The adaptors (one for each modality source image) translate the DICOM image data stream into the intermediate format, for images that have been previously acquired and stored.

Figure 4:
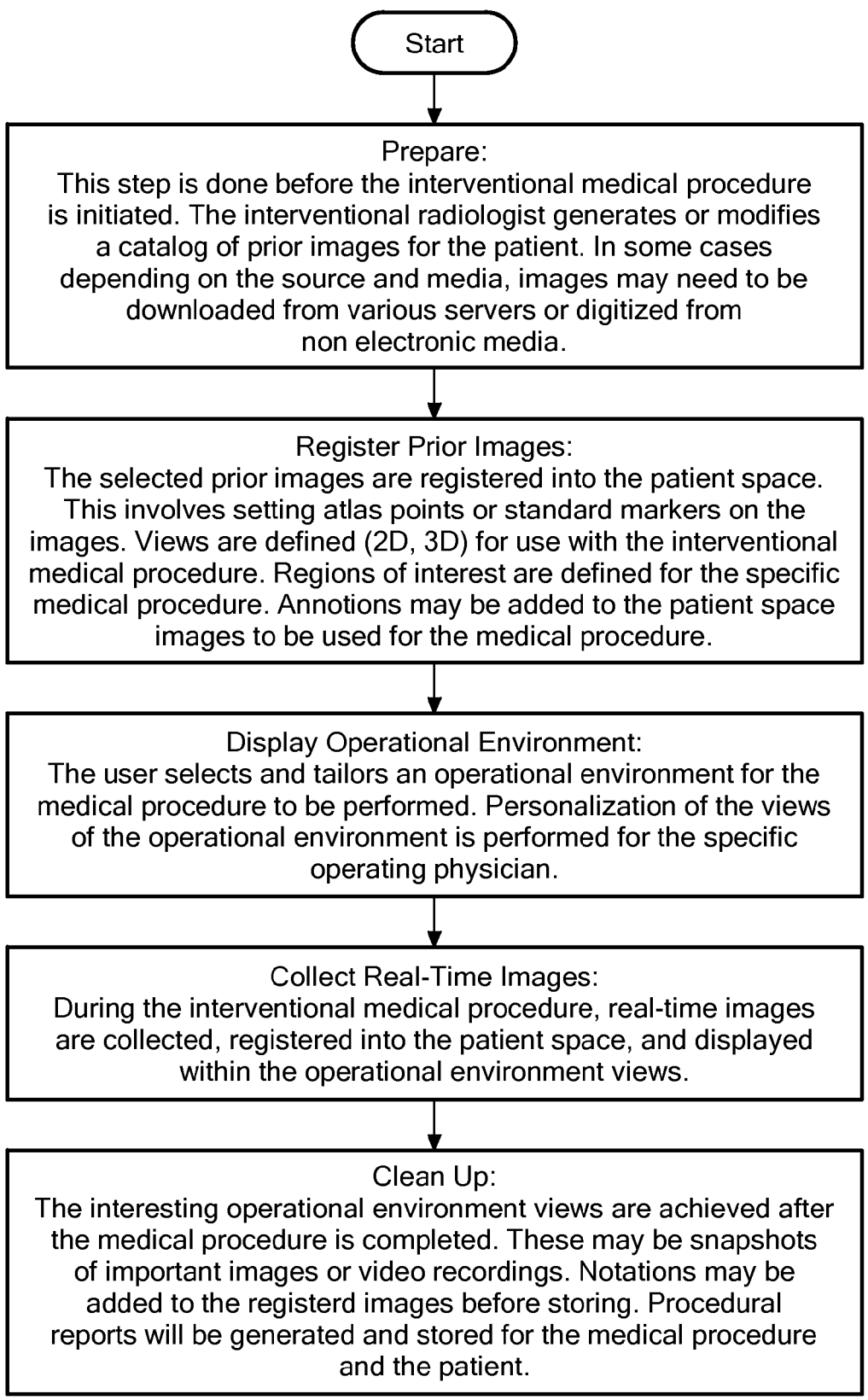
FIG. 4 is a flowchart of the operation of a Multi-Modality Image Fusion (MMIF) Platform used to fuse images taken from a plurality of different modalities according to the invention.

Referring to the flowchart in FIG. 4 the highest-level main workflow includes the following steps. The main business process workflow is called "Setup & Operate".

1. Prepare: This step is performed before the interventional medical procedure is initiated. The interventional radiologist generates or modifies a catalog of prior images for the patient. In some cases, depending on the source and media, images may need to be downloaded from various servers or digitized from non electronic media.

2. Register Prior Images: The selected prior images are registered into the patient space. This may involve setting atlas points or standard markers on the images. Views are defined (2D, 3D) for use with the interventional medical procedure. Regions of interest are defined for the specific medical procedure. Annotations may be added to the patient space images to be used for the medical procedure.

3. Display Operational Environment: The user selects and tailors an operational environment for the medical procedure to be done. Personalization of the views of the operational environment are performed for the specific operating physician.

4. Collect Real-Time Images: During the interventional medical procedure, real-time images are collected, registered into the patient space, and displayed within the operational environment views.

5. Clean Up: The interesting operational environment views are archived after the medical procedure is completed. These may be snapshots of important images or video recordings. Notations may be added to the registered images before storing. Procedural reports are generated and stored for the medical procedure and the patient.

In addition to the highest level workflow, other business processes are followed to administer, maintain, and modify MMIF when it is not being used for a medical procedure. These additional business processes may be performed by the interventional radiologist or a maintenance engineer depending on the specific use case and hospital procedures.

The catalog of MMIF use cases is given in the table below:

| Business Process | Use cases | |
|---|---|---|
| Setup & Operate | Prepare Configuration Manager | Display Operational Environment |
| | Register Prior Images | Clean Up |
| | Collect Real-Time Images | Assemble Prior Images |
| | | Set Markers |
| | Generate Prior Image Catalog | Define Procedural Views |
| | | Add Annotations Before |
| | Modify Prior Image Catalog | Procedure |
| | | Personalize Operational |
| | Define Regions of Interest | Environment |
| | | Display Real-Time |
| | Tailor Operational Environment | Images |
| | | Archive Video |
| | Register Real-Time Images | Recordings |
| | | Add Notations After |
| | Archive Image Snapshots | Procedure |
| | | Archive Procedural |
| | Define Procedural Reports | Reports |
| | Generate Procedural Reports | |
| System Maintenance | Generate Status Reports | Archiving |
| | Time Stamping | Find & Display Archived |
| | Management | Image Snapshots |
| | Add New Tools | Find & Display Archived Video Images |
| | | Find & Display Procedural Reports |
| System Administration | System Set-Up | User Administration |
| | System Upgrade | Backup & Recovery |
| | Initiation/Re-Operation | Database Management |
| | System Management | Network Management |

The MMIF use cases are described below in accordance with the catalog given above.

I. Setup & Operate Business Process

The use cases included are the functions that the interventional radiologist performs to register images and define regions of interest for a medical procedure.

Prepare Configuration Manager

Main Flow of Events:

The interventional radiologist generates or modifies a catalog of prior images for the patient. In some cases depending on the source and media, images may need to be downloaded from various servers or digitized from non-electronic media.

Exceptional Flow of Events:

Patient's name or other identification may be spelled incorrectly delaying finding and validating the prior images. Networking problems may delay acquiring the prior images.

Register Prior Images

Main Flow of Events:

The selected prior images are registered into the patient space.

Exceptional Flow of Events:

Registration problems may arise from images from multiple modalities or from older images that have been digitized.

Display Operational Environment

Main Flow of Events:

The user selects and tailors an operational environment for the medical procedure to be done.

Exceptional Flow of Events:

Images that have been successfully registered into the patient space may have problems with rendering into the specific views desired for the medical procedure.

Collect Real-Time Images

Main Flow of Events:

During the interventional medical procedure, real-time images are collected, registered into the patient space, and displayed within the operational environment views.

Exceptional Flow of Events:

The real-time images may fall outside the region of interest. Computing resources may be inadequate to collect, register, and display images fast enough for the medical procedure.

Clean Up

Main Flow of Events:

Upon completion of the medical procedure, the user identifies the information that will be useful from the procedure and store it for future procedures.

Exceptional Flow of Events:

Resources may be inadequate to store the desired information.

Generate Prior Image Catalog

Main Flow of Events:

The user develops a catalog of prior images that may be useful to the medical procedure.

Exceptional Flow of Events:

Patient's name or other identification may be spelled incorrectly delaying finding the prior images.

Modify Prior Image Catalog

Main Flow of Events:

This work flow is similar to Generate Prior Image Catalog, except the patient already has a catalog of prior images and the user may add additional images or delete those not of interest.

Exceptional Flow of Events:

Patient's name or other identification may be spelled incorrectly delaying finding the prior images.

Assemble Prior Images

Main Flow of Events:

The prior images identified in the image catalog are found and possibly loaded on the MMIF workstation. In some cases depending on the source and media, images may need to be downloaded from various servers or digitized from non-electronic media.

Exceptional Flow of Events:

The prior images identified in the image catalog may not be available for downloading. Patient's name or other identification may be spelled incorrectly delaying finding the prior images.

Set Markers

Main Flow of Events:

The user set markers on the prior images to be registered. These markers may be defined from atlas points possibly within the region(s) of interest.

Exceptional Flow of Events:

Prior images may not have recognizable markers or may not align within the region(s) of interest.

Define Procedural Views

Main Flow of Events:

Views are defined (2D, 3D) that make up the operational environment for use with the interventional medical procedure.

Exceptional Flow of Events:

Views must have relevance for the specific interventional medical procedure to be performed and be within the regions of interest.

Add Annotations Before Procedure

Main Flow of Events:

Annotations may be added to the registered images before the medical procedure is initiated.

Exceptional Flow of Events:

Annotations must be relevant to the specific medical procedure.

Tailor Operational Environment

Main Flow of Events:

An operational environment is tailored to the specific medical procedure by the user before it is initiated.

Exceptional Flow of Events:

Certain environments may not be relevant to the medical procedure to be performed.

Personalize Operational Environment

Main Flow of Events:

The operational environment may be personalized to the needs of the operating physician.

Exceptional Flow of Events:

Personalization may be done for the wrong operating physician, preferences may have changed, or personalizations done incorrectly.

Register Real-Time Images

Main Flow of Events:

Once the real-time image is collected, it is registered to the patient space and the operational environment.

Exceptional Flow of Events:

The real-time images may fall outside the region of interest. Computing resources may be inadequate to collect, register, and display images fast enough for the medical procedure.

Display Real-Time Images

Main Flow of Events:

The registered real-time image is displayed within the operational environment.

Exceptional Flow of Events:

The real-time images may fall outside the region of interest. Computing resources may be inadequate to collect, register, and display images fast enough for the medical procedure.

Archive Image Snapshots

Main Flow of Events:

Upon completion of the medical procedure, interesting image snapshots may be stored from the operational environment.

Exceptional Flow of Events:

Storage resources may be inadequate for archiving the images.

Archive Video Recordings

Main Flow of Events:

Upon completion of the medical procedure, video recordings taken during the medical procedure may be archived.

Exceptional Flow of Events:

Storage resources may be inadequate for archiving the images.

Add Notations After Procedure

Main Flow of Events:

Annotations may be added to the registered images after the medical procedure is initiated.

Exceptional Flow of Events:

Annotations must be relevant to the specific medical procedure.

Define Procedural Reports

Main Flow of Events:

Reports can be defined by the user consistent with the medical procedure and hospital regulations.

Exceptional Flow of Events:

Resources may be inadequate to define the desired reports. Reports must be defined and generated in accordance with the report generator used.

Generate Procedural Reports

Main Flow of Events:

Upon completion of the medical procedure, the user may generate the procedural reports.

Exceptional Flow of Events:

Resources may be inadequate to generate the desired reports. Reports must be defined and generated in accordance with the report generator used.

Archive Procedural Reports

Main Flow of Events:

Upon completion of the medical procedure, the use may archive the procedural reports.

Exceptional Flow of Events:

Storage resources may be inadequate for archiving the reports.

II. System Maintenance Business Process

System Maintenance Use Cases are Performed on a Non Operating MMIF

Generate Status Reports

Main Flow of Events:

It may be desirable for the maintenance engineer to define and generate status reports of an operational system from time to time. These reports can be used for monitoring system performance, debugging field problems, etc.

Exceptional Flow of Events:

Status reports must be defined and generated in accordance with the report generator used.

Time Stamping Management

Main Flow of Events:

Image snapshots and video recordings are stored periodically in the MMIF for later viewing, analysis, or future medical procedures for the same patient. Time stamping management sets a common time for the MMIF system. This normally will be local to the installation site. Daylight savings and other time zone settings are maintained in this use case. Time stamp formats are set.

Exceptional Flow of Events:

Checking is done such that substantial time gaps are not present in the data base for an operational system. Daylight savings settings are checked for consistency.

Add New Tools

Main Flow of Events:

New tools may be added to the MMIF platform. These could include numerics, statistical fusion, neighborhoods, etc.

Exceptional Flow of Events:

New tools may have naming conflicts with earlier tools. Adequate resources may not be available to install a new tool.

Archiving

Main Flow of Events:

This use case provides control over the archiving methods used. Archiving requires further definition but it could include database snapshots, data backup, storage, and retrieval services, etc.

Exceptional Flow of Events:
This may be an optional or delayed feature of MMIF.

Find & Display Archived Image Snapshots

Main Flow of Events:
It may be necessary to go back in time and retrieve an archived image snapshot. This use case applies to snapshots that are stored in MMIF. Other use cases not described here would be used to find & display images that are stored offline.
Exceptional Flow of Events:
The desired snapshot may not be stored in MMIF. The timestamp range may be specified incorrectly. There may be gaps in the storage history when the system was down.

Find & Display Archived Video Recorded Images

Main Flow of Events:
Video recordings can be found and displayed from the archived images. This use case applies to images that are stored in MMIF.
Exceptional Flow of Events:
The desired video recording may not be stored in MMIF. The timestamp range may be specified incorrectly. There may be gaps in the storage history when the system was down.

Find & Display Procedural Reports

Main Flow of Events:
This use case finds and displays the Procedural Reports stored by the Archived Procedural Reports use case.
Exceptional Flow of Events:
The desired Procedural Reports are not stored in MMIF. The timestamp range may be specified incorrectly. There may be gaps in the storage history when the system was down.

III. The System Administration Business Process is Made Up of All the Use Cases Related to Administration of the MMIF System

System Set-Up

Main Flow of Events:
System set-up is done on a new MMIF system. It includes installing the $3^{rd}$ party operating system, middleware, and database. It also includes installing a licensed set of imaging tools, filters, imaging registering software, translation software, and algorithms. A script is run to install a default user with administrator rights.
Exceptional Flow of Events:
Resources may not be available to support the installation configuration. Licensing may not be consistent with the installed configuration.

System Upgrade

Main Flow of Events:
It may be necessary to bring down a MMIF system to install newer versions of $3^{rd}$ party operating system, middleware, or database. It may also be necessary to bring down the system (as compared to the use cases in the System Maintenance Business Process) to install new tools, filters, or algorithms. New hardware (e.g., additional memory) may also be installed.
Exceptional Flow of Events:
Resources may not be available to support the installation configuration. Licensing may not be consistent with the installed configuration.

Initiation/Re-Operation

Main Flow of Events:
MMIF may need to be initiated; e.g., initial data installed. The system may also hang up and need to be rebooted.
Exceptional Flow of Events:
Initiation/Re-Operation may not be possible due to hardware failures or insufficient resources.

System Management

Main Flow of Events:
The MMIF system may need to be managed at start-up and time-to-time. This could include extending software maintenance agreements, license agreements, or other hardware maintenance activities (e.g., periodically clean filters).
Exceptional Flow of Events:
System management may not be possible due to hardware failures or insufficient resources.

User Administration

Main Flow of Events:
MMIF users will have different roles with associated rights and privileges. For MMIF 1.0, three types of users would be installed: administrator, user, and guest.
Exceptional Flow of Events:
User Administration may not be possible due to hardware failures or insufficient resources.

Backup & Recovery

Main Flow of Events:
The MMIF data in the database will be periodically backed up. In the case of a system failure, it may be desirable to recover the data at the time of failure and resume monitoring from that point in time.
Exceptional Flow of Events:
Appropriate hardware and backup/recovery procedures are required to possibly store the data media offsite.

Database Management

Main Flow of Events:
MMIF uses a relational database for storage and retrieval of information related to processes, algorithms, configuration, users, image acquisition systems, video recordings, and events. At installation this information must be set up and initialized in the database.
Exceptional Flow of Events:
Database management may not be possible due to hardware failures, insufficient resources, or inconsistent licenses.

Network Management

Main Flow of Events:
As an imaging workstation, MMIF will likely be connected to a radiology network such as PACS and receive and send images using the DICOM protocol. Thus, MMIFs may be networked to perform medical procedures across a site or sites. This network topology must be initialized at installation to enable radiology network communication.

Exceptional Flow of Events:

Communications hardware must be available for the network defined. The network definition must be consistent with the application and hospital regulations.

Figure 5:
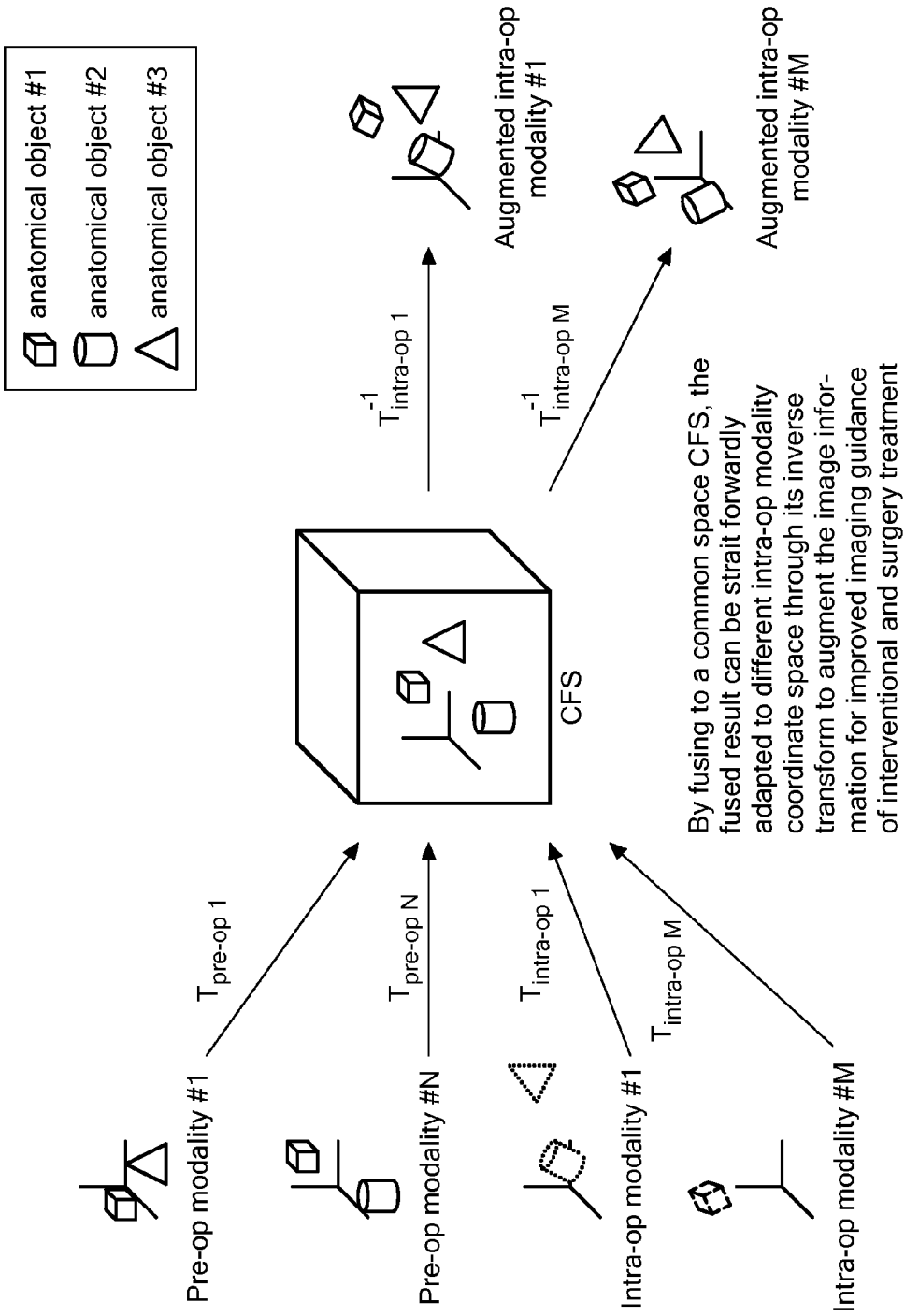
FIG. 5 is a diagram illustrating the use of the MMIF platform and its use in intra-operative or interventional applications in accordance with the invention.

Referring now to FIG. 5, such FIG. shows the use of the MMIF platform in intra-operative or interventional applications. Thus, having referenced pre-operative and even intra-operative modalities into the common reference space (i.e., the CFS), the process enables the surgeon to extract from the CFS selected augmented intra-operative modalities for guidance. Thus, by fusing pre-operative and even intra-operative modalities to a common space CFS, the fused result can be straight forwardly adapted to different intra-op modality coordinate space through its inverse transformation to augment the image information for improved imaging guidance of interventional or surgery treatment.

That is, image registration is the process of estimating a proper spatial transformation so that two or more images of the same scene taken at different times, from different viewpoints, and/or by different sensors can be overlayed together. In other words, registration optimizes the parameters that describe a spatial transformation between the source and reference (template) images. Transformation, as used in the paragraph above and in FIG. 5, refers to re-sampling of image according to the determined transformation parameters. The typical transformation is rigid (translation and rotation but no deformation) & non-rigid transformation.

A number of embodiments of the invention have been described. Nevertheless, it will be understood that various modifications may be made without departing from the spirit and scope of the invention. Accordingly, other embodiments are within the scope of the following claims.

What is claimed is:

1. A method for fusing a plurality of ages for use in an interventional or surgical procedures comprising a processor:
   acquiring the plurality of images from a plurality of different modalities, each one of the images having a different DICOM format;
   translating each of the plurality of images from their DICOM formats to a common intermediate format;
   registering and fusing the plurality of translated images into the common intermediate format to create a new image, such common intermediate format being different from the DICOM formats of each one of the plurality of acquired images, and
   rendering the registered and fused new image to a display for an intraoperative procedure.

2. The method recited in claim 1 wherein each translated image is registered within a 3-dimensional patient space and then rendered as a combined image within a specified timeframe.

3. The method recited in claim 2 wherein the registration is performed using a combination of physical body markers and raw intensity images.

4. The method recited in claim 3 wherein the physical body markers include locations of various organs or joints, artificial markers defined by the procedure being performed, computer-automatically extracted features or markers.

5. The method recited in claim 3 wherein the raw intensity images are based on their availability for the intra-operative procedures.

6. The method recited in claim 4 wherein the raw intensity images are based on their availability for the inter-operative space procedure.

7. The method recited in claim 1 wherein the common intermediate format is adapted to a 3-dimensional patient space for surgical device navigation and treatment during the intra-operative procedure.

8. The method recited in claim 2 wherein the common intermediate format is adapted to the 3-dimensional patient space for surgical device navigation and treatment during the interventional or surgery procedure.

9. The method recited in claim 3 wherein the common intermediate format is adapted to the 3-dimensional patient space for surgical device navigation and treatment during the intra-operative procedure.

10. The method recited in claim 4 wherein the common intermediate format is adapted to the 3-dimensional patient space for surgical device navigation and treatment during the intra-operative procedure.

* * * * *